March 23, 1971  H. A. GUMTOW  3,572,218
CONNECTING MEANS BETWEEN DIAPHRAGM AND ACTUATOR ROD
Filed March 14, 1968  2 Sheets-Sheet 1

Inventor
Herbert A. Gumtow

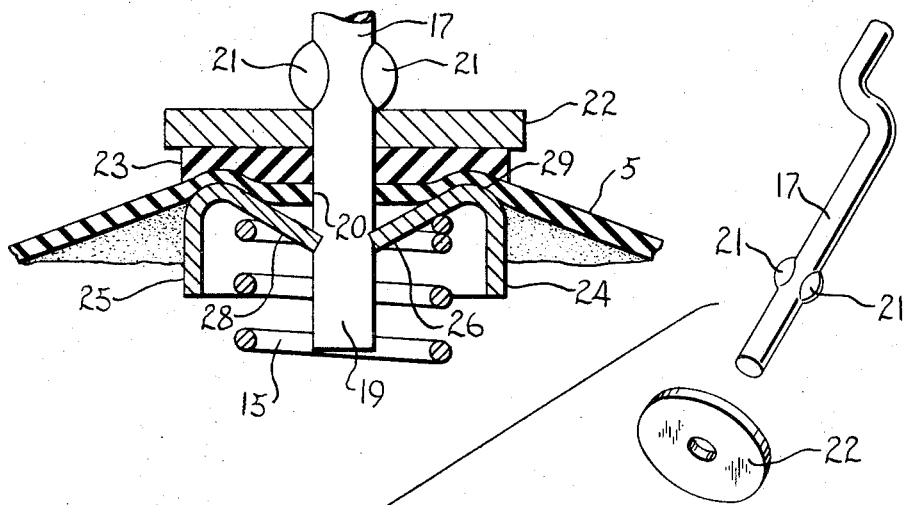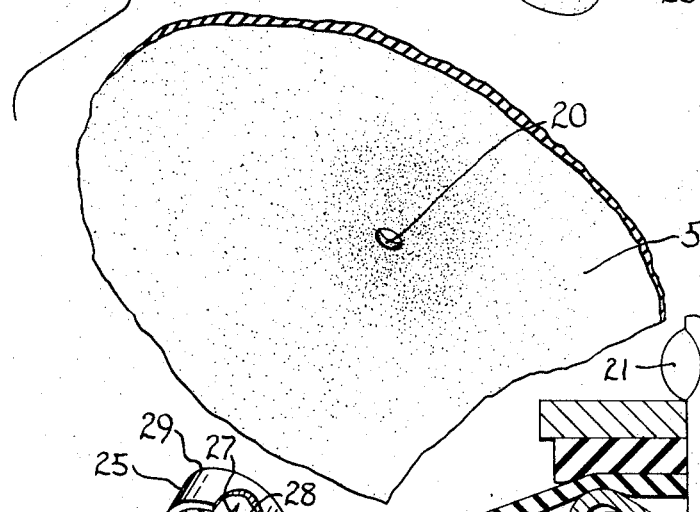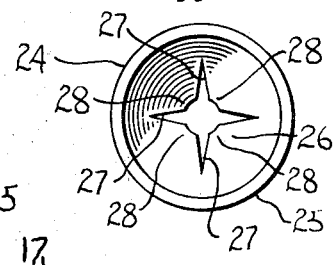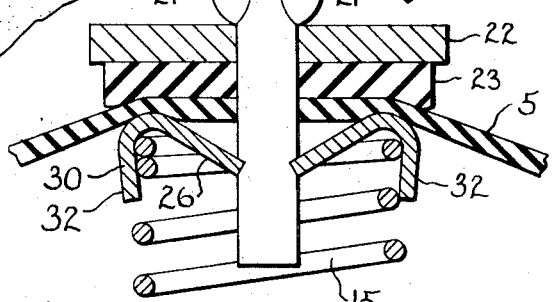

United States Patent Office 3,572,218
Patented Mar. 23, 1971

3,572,218
CONNECTING MEANS BETWEEN DIAPHRAGM AND ACTUATOR ROD
Herbert A. Gumtow, Brookfield, Wis., assignor to Briggs & Stratton Corporation, Milwaukee, Wis.
Filed Mar. 14, 1968, Ser. No. 713,209
Int. Cl. F01b 19/00
U.S. Cl. 92—99
2 Claims

ABSTRACT OF THE DISCLOSURE

A hermetically tight connection between a flexible diaphragm and an actuator rod which passes through a hole in the diaphragm is provided by clamping the diaphragm between a washer which bears against a shoulder on the rod and a cup-shaped retaining member forced onto the rod and secured in place by fingers which bite into the rod. A coil spring seated in the cup-shaped retaining member biases the diaphragm in one direction.

---

This invention relates to diaphragm actuated devices such as the suction responsive automatic choke actuator of the pending patent application Ser. No. 622,032, filed Aug. 28, 1967, and assigned to the assignee of this application.

More particularly, this invention is concerned with the securement of an actuator rod to a flexible diaphragm.

The simplest way of connecting an actuator rod to a diaphragm is to have the rod project through a hole in the diaphragm and to clamp the diaphragm between a pair of discs of washers, one of which is fixed to the rod and the other held in place by a nut threaded onto the rod. But the necessity for providing the rod with screw threads adds an element of expense, both in production of the parts and in assembly time.

Moreover, difficulty has been experienced in the past in achieving a hermetically tight connection between the rod and the diaphragm. A hermetically tight connection is of utmost importance for if there is any leakage at this point, the diaphragm will not be sensitive to slight pressure changes.

It is therefore the purpose and object of this invention to provide an improved connection between an actuator rod and a diaphragm which can be quickly effected and which provides against leakage at the junction of the diaphragm with the actuator rod.

Another object of this invention is to provide a connector for securing an actuator rod to a diaphragm which utilizes the advantages of a spring clip fastener of the Tinnerman type.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiment of the invention constructed according to the best modes so far devised for the practical application of the principles thereof and in which:

FIG. 2 is an enlarged detail view, in section, of the connection between the diaphragm and the actuator rod;

FIG. 3 is an exploded perspective view of the central portion of the diaphragm, the actuator rod and the parts involved in the connection of the rod to the diaphragm;

FIG. 4 is a plan view of the retaining member which forms part of the connection;

FIG. 5 is a sectional view similar to FIG. 2, illustrating a modified embodiment of the invention; and FIG. 6 is a perspective view of the retaining member of the modified embodiment of the invention.

Figure 1:
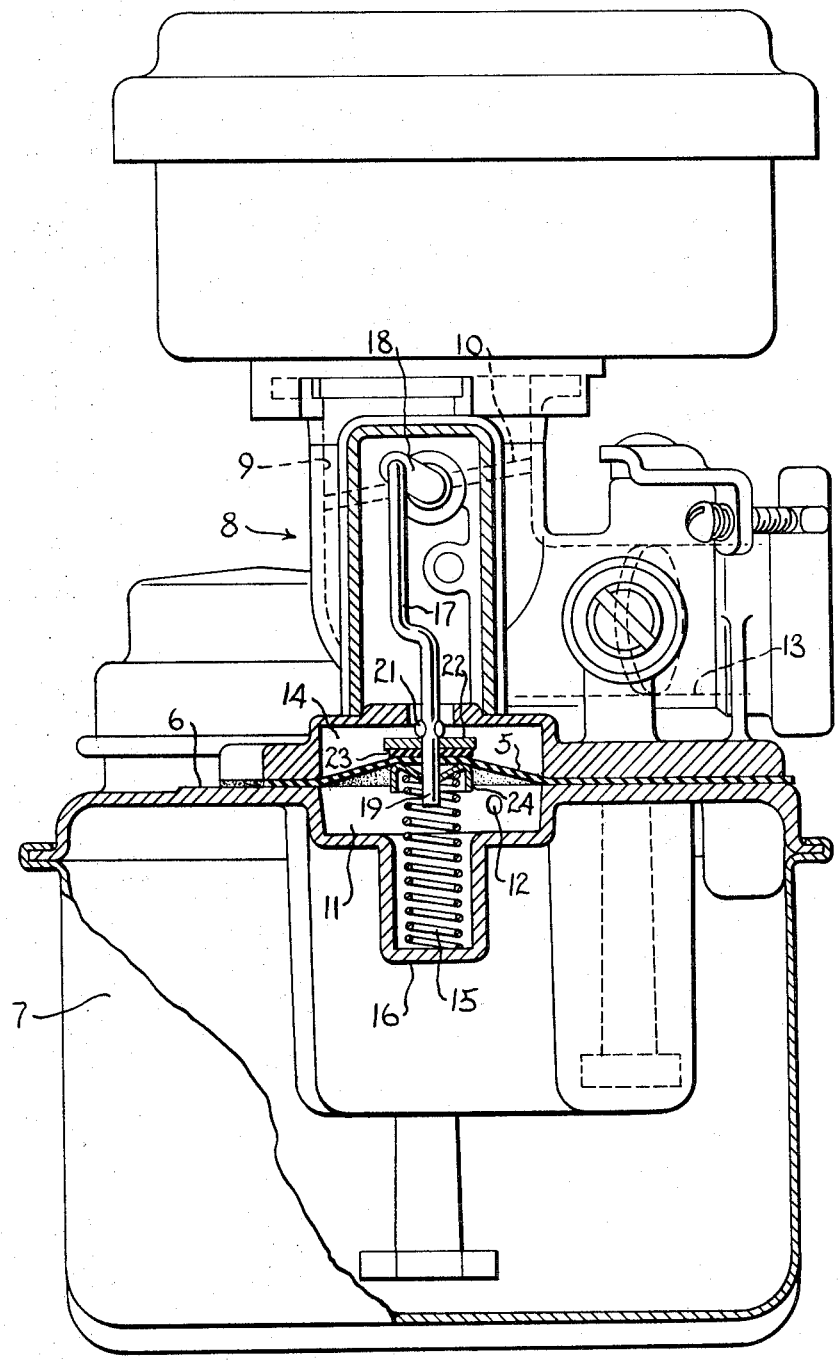
FIG. 1 is a view partly in elevation and partly in section of a combined carburetor and fuel tank for small internal combustion engines, equipped with an automatic choke of the type covered by the aforesaid pending application, and illustrating the adaptation of this invention thereto.

Although the invention is not concerned with the mechanism actuated by the diaphragm, the drawings illustrate the invention embodied in a representative structural environment. Thus, as shown in FIG. 1, a diaphragm 5 is confined between the top wall 6 of a fuel tank 7 and the underside of a carburetor 8, the carburetor and fuel tank being suitably secured together by screws, not shown, to form a unitary structure. The carbuetor has an air inlet passage 9 controlled by a butterfly type choke valve 10, which is automatically actuated from one position to another by flexure of the diaphragm 5.

The diaphragm forms one wall of a chamber 11 which is communicated through a port 12 and a duct (not shown) with the fuel mixture passage 13 of the carburetor, so that the pressure within the chamber 11 is a function of engine operation. The space 14 above the diaphragm is open to the atmosphere, and a coil spring 15 reacting between the underside of the diaphragm and the bottom wall 16 of the chamber 11 yieldingly biases the diaphragm in an upward direction.

An actuator rod 17 connects the diaphragm with the choke valve 10 through a crank arm 18 so oriented that the upward thrust of the spring 15 on the diaphragm moves the choke valve to its closed position, in which it is shown in FIG. 1; while downward flexure of the diaphragm in response to engine suction manifested in the chamber 11 opens the choke valve.

The lower end portion 19 of the actuator rod passes through a hole 20 in the diaphragm and is connected to the diaphragm in a manner distinguished by unprecedented simplicity and assurance against leakage through the diaphragm. Thus, as shown, the actuator rod, which is simply a length of stiff wire bent to the desired shape, has a pair of ears or bosses 21 formed at opposite sides thereof to provide a shoulder against which a metal washer 22 bears. The part of the rod below the ears 21 constitutes its lower end portion 19 which passes through the hole in the diaphragm. Between the underside of the metal washer 22 and the upper face of the diaphragm, there is a rubber washer 23 which fits the rod portion 19 quite closely, and which provides a downwardly facing flat bearing surface with which the diaphragm has surface-to-surface engagement.

The diaphragm is clamped against the downwardly facing bearing surface provided by the rubber washer 23 by means of a retaining member 24 secured to the rod beneath the diaphragm. This retaining member has the characteristics of a Tinnerman type fastener, in that it is secured in place by simply forcing it axially onto the rod, as distinguished from a nut threaded onto the rod as was commonly done heretofore.

The retaining member is a cup-shaped metal stamping having a substantially cylindrical side wall 25 and an inwardly directed conical bottom wall 26. At the apex of the conical bottom wall there is a round hole of a diameter slightly less than that of the rod portion 19, and radiating from the edge of the hole are four slits 27 which divide the bottom wall into four spring fingers 28.

The conical bottom wall of the cup-shaped stamping joins its side wall with a relatively sharp bend, the exterior of which provides a circular edge 29 which lies in a plane normal to the axis of the stamping and has a diameter no greater than that of the rubber washer 23.

Hence, upon placement of the retaining member on the lower end portion 19 of the actuator rod with the circular edge 29 facing the diaphragm and forcible engagement of the retaining member against the diaphragm, the diaphragm will be clamped between the rubber washer 23 and the circular edge 29. This localized compression of the diaphragm and the rubber washer, best shown in FIG. 2, hermetically seals off the central area of the diaphragm in which the hole 20 is located from the rest of the diaphragm, so that despite the projection of the actuator rod through the diaphragm, the diaphgram provides a hermetically tight wall for the chamber 11.

The close fit of the rubber washer 23 on the rod also contributes to the establishment of a hermetically tight connection between the rod and the diaphragm.

As will no doubt be appreciated, during the application of the retainer member onto the rod, the spring fingers 29 are readily sprung out of their normal positions, but with the slightest movement of the retaining member in the opposite or downward direction, the ends of the fingers bite into the rod and hold the retaining member against further downward movement. Because of the resilience of the diaphragm and the rubber washer, it is possible to push the retaining member onto the rod far enough to assure that the very slight downward displacement of the retaining member needed to have its spring fingers bite into the rod, will not affect the tightness of the seal which this invention provides for the connection between the diaphragm the actuator rod.

The cup-shaped formation of the retaining member with its inwardly directed conical bottom wall not only provides the relatively sharp circular edge 29 and the properly oriented spring fingers 28, but also serves to keep the spring 15 centered on the diaphragm since, as shown, the spring fits rather snugly into the cup-shaped stamping.

The modified embodiment of the invention illustrated in FIGS. 5 and 6 differs from that shown in FIGS. 1–4 only in the specific shape of the retaining member. Thus, as best seen in FIG. 6, the retaining member 30 has a relatively flat wall 31 surrounding and merging with the base of its slitted conical wall 26. The wall 31 is substantially cruciform in shape and the extremities of the two opposite arms thereof are bent down to provide a pair of spring retaining fingers 32. These fingers are slightly inclined towards one another to grip the adjacent end coils of the spring 15. Hence it is possible to attach the spring to the diaphragm before the diaphragm is placed in position over the mouth of the chamber 11. This greatly facilitates assembly of the structure.

In all other respects, the modified embodiment of the invention is like that shown in FIGS. 1–4.

What is claimed as my invention is:

1. A diaphragm actuated device wherein a diaphragm forms a wall of a chamber, and a helical compression spring confined between the diaphragm and the opposite wall of the chamber yieldingly urges the diaphragm in an outward direction, and coacts with suction manifested in the chamber to effect in and out flexure of the diaphragm, and wherein an actuator rod which has one end portion projecting through a hole in the diaphragm into the adjacent end of the spring is connected to the diaphragm to translate flexure thereof into motion of a part of said device, characterized by means independent of said chamber holding the diaphragm and spring in subassembled relation to the rod and also providing a hermetically tight connection between the diaphragm and the actuator rod, comprising:

(A) means on the actuator rod providing a supporting surface for one side of the diaphragm, which surface lies in a plane normal to the actuator rod and surrounds the same;

(B) and a retaining member secured to said end portion of the rod, between the diaphragm and the adjacent end of its spring, and clamping the diaphragm between it and said supporting surface, said retaining member being a stamping having (1) a conical wall that converges away from the diaphragm and has its base lying in a plane normal to the axis of the cone and providing a pressure applying portion of a size no greater than that of said supporting surface, (2) said conical wall having a hole at its apex slightly smaller than the diameter of the edge of the hole dividing the conical wall into a plurality of resilient fingers which yield and permit application of the retaining member onto said projecting end portion of the rod with said pressure applying portion facing the diaphragm, but grip the rod and prevent displacement of the retaining member from a position clamping the diaphragm between said pressure applying portion and the supporting surface.

(3) spring centering means engaging the adjacent end of the compression spring and holding the same centered with respect to said conical wall and in concentric encircling relation to said projecting end portion of the rod, (4) and spring retaining means on the retaining member engaging adjacent convolutions of the spring to prevent axial displacement of the spring from its position encircling said projecting end portion of the rod.

2. The device of claim 1, wherein said spring retaining means comprises a pair of fingers which project from the pressure applying portion of the retaining member in the same direction as the conical wall thereon, and which embrace diametrically opposite sides of the spring, said fingers having end portions which are bent inwardly toward one another to confine at least one of the adjacent spring convolutions between them and the pressure applying portion of the retaining member.

References Cited
UNITED STATES PATENTS

| | | | |
|---|---|---|---|
| 1,999,285 | 4/1935 | Davis | 92—100 |
| 2,561,473 | 7/1951 | Hughes | 85—36 |
| 2,618,009 | 11/1952 | Tinnerman | 85—36X |
| 2,643,721 | 6/1953 | Arbuckle | 85—36 |
| 2,674,150 | 4/1954 | Flora | 85—36 |
| 2,900,865 | 8/1959 | Mayon | 85—36 |
| 3,229,592 | 1/1966 | Puster | 92—100 |
| 3,326,509 | 6/1967 | Kuttler | 85—36X |
| 3,437,014 | 4/1969 | Deibel et al. | 92—100X |

MARTIN P. SCHWADRON, Primary Examiner

L. J. PAYNE, Assistant Examiner

U.S. Cl. X.R.

85—36; 92—128